US008868405B2

(12) United States Patent
Kasravi et al.

(10) Patent No.: US 8,868,405 B2
(45) Date of Patent: Oct. 21, 2014

(54) SYSTEM AND METHOD FOR COMPARATIVE ANALYSIS OF TEXTUAL DOCUMENTS

(75) Inventors: Kas Kasravi, W. Bloomfield, MI (US); Walter B. Novinger, Raleigh, NC (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1362 days.

(21) Appl. No.: 10/766,308

(22) Filed: Jan. 27, 2004

(65) Prior Publication Data

US 2005/0165600 A1   Jul. 28, 2005

(51) Int. Cl.
   *G06F 17/27*   (2006.01)
   *G06F 17/30*   (2006.01)
   *G06F 17/22*   (2006.01)

(52) U.S. Cl.
   CPC ...... *G06F 17/30684* (2013.01); *G06F 17/2211* (2013.01); *G06F 17/2785* (2013.01)
   USPC .......................... 704/9; 704/7; 704/8; 704/10

(58) Field of Classification Search
   None
   See application file for complete search history.

(56) References Cited

U.S. PATENT DOCUMENTS

| 4,364,189 | A |   | 12/1982 | Bates |
| 4,524,037 | A |   | 6/1985 | Marc |
| 4,595,551 | A |   | 6/1986 | Maurer |
| 4,627,177 | A |   | 12/1986 | Meyers |
| 4,980,110 | A |   | 12/1990 | Nelson et al. |
| 5,273,702 | A |   | 12/1993 | Nelson et al. |
| 5,987,446 | A | * | 11/1999 | Corey et al. ................. 707/3 |
| 6,523,026 | B1 | * | 2/2003 | Gillis ............................ 707/3 |
| 6,578,031 | B1 |   | 6/2003 | Washizawa |
| 6,847,966 | B1 | * | 1/2005 | Sommer et al. ............... 707/5 |
| 6,996,575 | B2 | * | 2/2006 | Cox et al. ................... 707/102 |
| 7,113,943 | B2 | * | 9/2006 | Bradford et al. .............. 707/4 |

OTHER PUBLICATIONS

International Search Report for International Application No. PCT/US2004/041538 dated Apr. 7, 2006.
Hotho at al., "Ontologies Improve Text Document Clustering", Proceedings of ICDM 03, 2003.
Rongione, N., "Using Semantic Document Representations to Increase Performance in Information Retrieval", University of British Columbia, British Columbia, Canada1995,.
Sandford et al., "Outil D'Extradcation De La Semantique D'un Corpus Textuel", Presses de l'Universite de Montreal, Canada, 1997, vol. 42, No. 2, pp. 356-363.
Besancon et al., "Textual Similarities based on a Distribulional Approach", IEEE Press, 10th International Workshop on Database and Expert Systems Applications (DEXA), 1999.
Ackerman, Rich, "Vector Model Information Retrieval", Florida State University, Sep. 25, 2003.
Office Communication, European Patent Application No. 04 818 002.0-1527, Jun. 27, 2008, 26 pages.

* cited by examiner

*Primary Examiner* — Leonard Saint Cyr

(57) ABSTRACT

A system and method are presented for the comparative analysis of textual documents. In an exemplary embodiment of the present invention the method includes accessing two or more documents, performing a linguistic analysis on each document, outputting a quantified representation of a semantic content of each document, and comparing the quantified representations using a defined metric. In exemplary embodiments of the present invention such a metric can measure relative semantic closeness or distance of two documents. In exemplary embodiments of the present invention the semantic content of a document can be expressed as a semantic vector. The format of a semantic vector is flexible, and in exemplary embodiments of the present invention it and any metric used to operate on it can be adapted and optimized to the type and/or domain of documents being analyzed and the goals of the comparison.

32 Claims, 9 Drawing Sheets

300 "I saw the man in the park with a telescope"

- EDS ~ 500
  - CEO [100] ~ 510
    - Dave Bookbinder [100] ~ 511
  - Founded [90] ~ 520
    - 1962 [65] ~ 521
  - Industry [95] ~ 538
    - Media [55] ~ 537
  - Acquired [90] ~ 540
    - Tunes On Line [88] ~ 541

Fig. 6

| | | |
|---|---|---|
| 600 | ~ | {Company → ABC Publishing} |
| 610 | ~ | {ABC Publishing → CEO(100) → Dave Bookbinder(100)} |
| 620 | ~ | {ABC Publishing → Founded(90) → 1962(65)} |
| 630 | ~ | {ABC Publishing → Industry(95) → Media (55)} |
| 640 | ~ | {ABC Publishing → Acquired(90) → Tunes On Line (88)} |

US 8,868,405 B2

SYSTEM AND METHOD FOR COMPARATIVE ANALYSIS OF TEXTUAL DOCUMENTS

TECHNICAL FIELD

The present invention relates to the application of artificial intelligence techniques to automatically identify documents and other written materials with unique semantic content. More particularly, the present invention relates to a system and method for the comparative analysis of textual documents by creating and comparing semantic vectors.

BACKGROUND INFORMATION

Globally, industries are experiencing a significant increase in the amount of unstructured information, especially textual. This fact is supported by reports from various market research firms, such as the recent finding that the amount of text-based data alone will grow to over 800 terabytes by the year 2004. It has also been recently determined that between 80-90% of all information on the Internet and stored within corporate networks is unstructured. Finally, it has been noted that the amount of unstructured data in large corporations tends to double every two months.

Thus, the volume of extant textual data is growing exponentially. Because this data can contain a significant amount of business-critical information, there is a growing need for some type of automated means for processing this data, such that the value buried in it can be extracted. Ideally, such a method would involve natural language processing systems and methods. One such potential method is the ability to compare and contrast two or more documents at the semantic level, to detect similarities of meaning or content between them as well as identify specific concepts which may be of interest. While a group of human reviewers or researchers could easily perform such a task, given the sheer volume and wide variety of subject matter created by even medium size businesses, it would tend to be complex and time consuming. In most large businesses, such a task would require a dedicated department whose cost would generally not be economically justifiable.

What is thus needed in the art is an automated system and method for the natural language processing of textual data so as to discover (i) valuable content contained within such data; and (ii) mutual similarities or divergences between or among two or more documents. Such a system and method could then generate reports of the results of such processing in one or more forms readily useable by humans.

SUMMARY OF THE INVENTION

A system and method are presented for the comparative analysis of textual documents. In an exemplary embodiment of the present invention the method includes accessing two or more documents, performing a linguistic analysis on each document, outputting a quantified representation of a semantic content of each document, and comparing the quantified representations using a defined metric. In exemplary embodiments of the present invention such a metric can measure relative semantic closeness or distance of two documents. In exemplary embodiments of the present invention the semantic content of a document can be expressed as a semantic vector. The format of a semantic vector is flexible, and in exemplary embodiments of the present invention it and any metric used to operate on it can be adapted and optimized to the type and/or domain of documents being analyzed and the goals of the comparison.

BRIEF DESCRIPTION OF THE DRAWINGS

FIG. 5 illustrates an exemplary hierarchical and weighted representation of the information contained in the semantic net of FIG. 4 according to an exemplary embodiment of the present invention;

FIG. 6 illustrates an exemplary semantic vector according to an exemplary embodiment of the present invention;

DETAILED DESCRIPTION OF THE INVENTION

Figure 1:
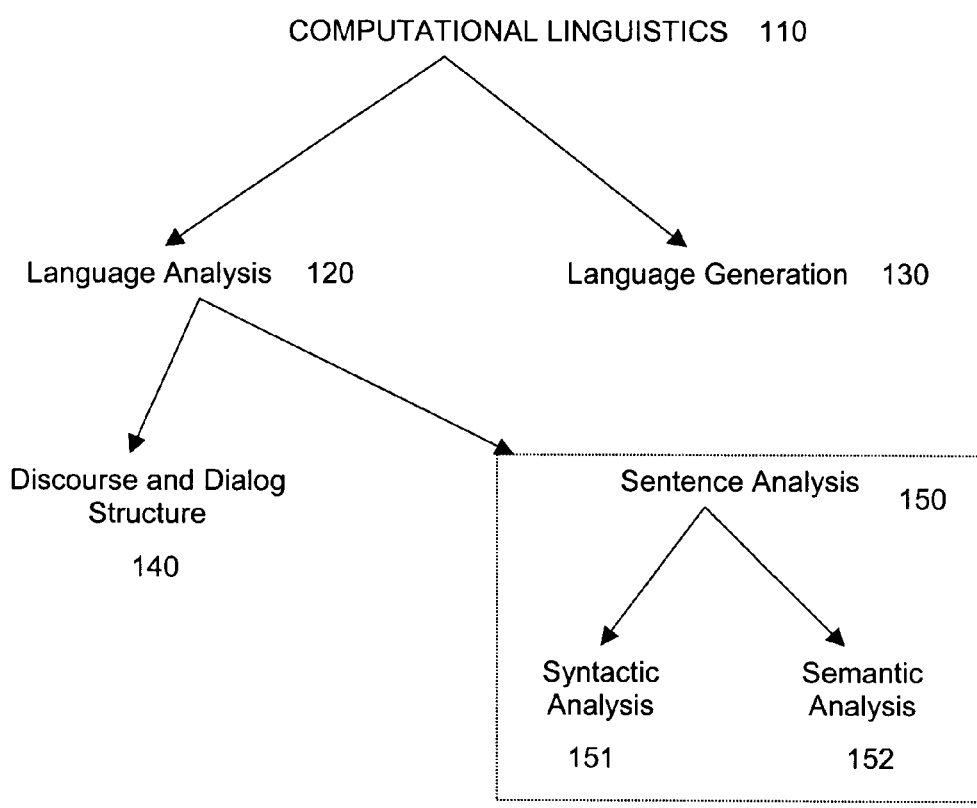
FIG. 1 depicts an exemplary conceptual taxonomy of computational linguistics highlighting sentence analysis.

The present invention facilitates the comparative analysis of the semantic content of textual documents. In so doing a system and method are presented for automatically processing the semantic content of a document quantitatively to extract a representation of the document's semantic content in a form that can be machine processed. The disclosed method facilitates a text corpus being automatically read, processed and compared to any other text corpus to determine the semantic "distance" (i.e., some convenient numeric measure of similarity in meaning) of one document from another.

Various text analysis tools and techniques provide capabilities in the areas of syntactic, semantic and statistical analysis of textual documents. In exemplary embodiments of the present invention one or more of these tools can be used to extract semantic content from documents which are to be comparatively analyzed. A brief description of these tools follows.

Text-Mining

In exemplary embodiments of the present invention textual documents are accessed, automatically read line by line, and subjected to text mining to extract their semantic content. Text-mining can include a variety of computational linguistic techniques such as, for example, a syntactic analysis to extract a number of tokens, followed by a semantic analysis to discover relationships between such tokens. The results of text-mining can be, for example, presented as or more "semantic nets" associated with a document. As described below, a semantic net can be easily converted into a "semantic vector" which can be easily used as an input to a computational algorithm. As described below, a semantic net can be easily converted to a semantic vector. Alternatively, text-mining results can be presented as simple lists of unique words and their frequencies, words and their synonyms, phrases, etc. Moreover, because lists and synonym mappings do not provide information related to the semantic context of the words and phrases which are automatically found semantic nets can often be more useful. Thus, because semantic nets relate words and/or phrases to other words and/or phrases in their respective contexts, often in seemingly non-intuitive manners, a semantic net can be a preferred choice for such output.

All text-mining approaches are either based on the theories of computational linguistics (such as, for example, syntactic and semantic analysis) or statistics (such as, for example, Bayesian, Markov Chains etc.). Text-mining is thus a set of different capabilities that can perform different functions. For example, Information Extraction involves identifying key concepts and extracting them into a data base; Categorization involves grouping multiple documents into pre-defined sets based on their degrees of similarities; and Navigation involves providing tools that allow the reader to rapidly navigate through a document by "jumping" from concept to concept. In comparative document analysis, what is needed is to conceptually quantify the content of a document for comparison purposes. Thus, in exemplary embodiments of the present invention semantic nets (and thus semantic vectors) are a wise choice, where the conceptual contents of two documents needs to be juxtaposed and compared in a quantitative manner. To illustrate such exemplary embodiments, the basics of text-mining are first next discussed.

Text-mining involves looking for patterns in natural language texts. Text-mining can be defined as the process of analyzing a text corpus to extract information from it for particular purposes. A text corpus can be any quantity of text. For purposes of illustration, what will often be referred to is a textual "document." This term is to be understood in its most expansive sense, and is therefore understood to include any quantity of text in any format that can be subjected to linguistic analysis.

The goal of text-mining is information discovery. Unlike numerical analysis techniques such as, for example, data-mining, that operate on structured data, text-mining deals with the analysis of text-based data. It is recognized that a complete understanding of natural language text, although a long-standing goal of computer science, is not immediately attainable. Thus text-mining focuses on extracting a relatively small amount of information from documents with high reliability. Such extracted information could be, for example, the author, title and date of a publication, letter or article, the acronyms defined in a document, or the articles mentioned in a bibliography.

Text-mining is based on multiple technologies, including computational linguistics, other artificial intelligence techniques, pattern recognition, statistics and information retrieval. In exemplary embodiments of the present invention documents can be processed via sentence analysis, a subcategory of computational linguistics. This will next be described with reference to FIGS. 1-3.

Generally, computational linguistics is understood to be the study and development of computer algorithms for natural language understanding and natural language generation. With reference to FIG. 1, an exemplary hierarchical division of the field is presented. Computational linguistics 110 can be divided into Language Analysis 120 and Language Generation 130. The semantic analysis of textual documents is concerned with language analysis techniques. Language Analysis 120 itself can be divided into Discourse and Dialog Structure 140 (useful, for example, to properly divide multiple simultaneous conversations, such as in Internet chat room monitoring applications) and Sentence Analysis 150, which is the most useful technology in the context of the present invention.

Figure 2:
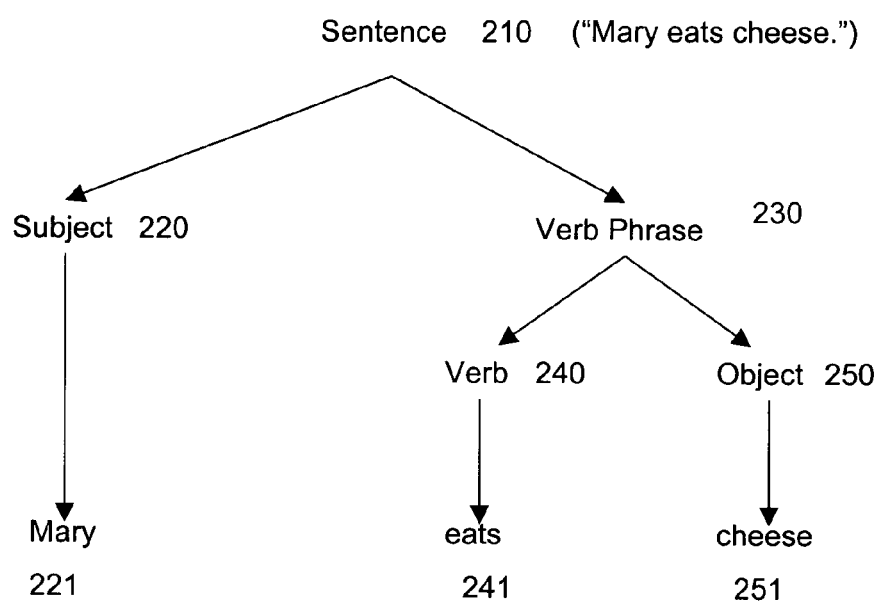
FIG. 2 illustrates an exemplary syntactic analysis according to an exemplary embodiment of the present invention.

Sentence Analysis 150 is further divided into two parts, Syntactic Analysis 151 and Semantic Analysis 152. FIG. 2 illustrates an example of syntax analysis. Syntactic analysis is concerned with determining the structure of a sentence, and the generation of a parse tree using a grammar. Thus, in FIG. 2, a sentence 210 "Mary eats cheese" is divided into a subject 220 ("Mary" 221) and a verb phrase 230 ("eats cheese" 241, 251). The verb phrase 230 is further divisible into a verb 240 ("eats" 241) and an object 250 ("cheese" 251). While this simple sentence is relatively unambiguous, more complex sentences often are not. Ambiguity at the syntactic level can be resolved via semantic analysis, as depicted in FIG. 3.

Figure 3:
FIG. 3 illustrates example ambiguities at the syntactic level, thus motivating semantic analysis according to an exemplary embodiment of the present invention.
Figure 3:
Figure 3:

With reference to FIG. 3, the semantic possibilities of the sentence "I saw the man in the park with a telescope" 300 are illustrated. Using a similar syntax analysis as depicted in FIG. 2, there can be found a subject "I" and a verb phrase "saw the man in the park with a telescope." The verb is obviously "saw." The semantic ambiguity lies in determining the object, and turns on what exactly the prepositional phrase "with a telescope" modifies. This phrase could modify the verb "saw", as depicted in frame 310, denoting that the subject used a telescope to see the man in the park. Or, alternatively, as depicted in frames 320 and 330, the phrase could modify "man" and refer either to the man being near a telescope or actually holding a telescope, the difference turning on the semantic sense of the preposition "with." These ambiguities can, for example, be resolved in a semantic analysis, which can, for example, not only capture the linguistic "tokens" or concept-words, but can also discover their meaning, in terms of the relationships between them.

Multiple techniques can be used in semantic analysis. One such method, for example, is "deep parsing", where in addition to analyzing a target sentence as illustrated above (shallow parsing) sentences and paragraphs before and after the target sentence can be considered. Thus, in the exemplary sentence of FIG. 3, it could be, for example, that the observer has already been associated with a telescope (such as by the statement "he carried the telescope to the roof top"), thus implying that the observer was in possession of a telescope—and thus that the observer was the person who looked through a telescope at the man in the park, allowing the conclusion that frame 310 correctly depicts the meaning of the sentence.

It is generally accepted in the computational linguistics community that organizational information tends to be 20% data and 80% text. Textual analysis tools can be thus used to potentially extract the value inherent in the 80% of the information repository which is textual. The information extracted by text-mining can be in the form of basic features such as, for example, names, locations, or products, and the relationships among those features, such as, for example, the relation between a company and a given person, such as, for example, the fact that John Doe is the President of Company XYZ, or that Richard Roe is the head of the Overseas Marketing Division of Alpha Corporation. This level of information extraction can be far more powerful then simply implementing key word searches, because the extracted information is based on the context within the document, and not simply upon its syntax. As a result the extracted information can reflect the meaning, or semantic content, of a given document.

In exemplary embodiments of the present invention, semantic data can be obtained from a document using feature extraction, which a type of text-mining. Table I below illustrates an exemplary document and exemplary information that can be extracted from it in this way. The extracted information can be used, for example, to develop knowledge networks (i.e., a linked network of features), to populate databases for subsequent analysis, or for mutual comparison.

TABLE I

Feature Extraction Example

| DOCUMENT | EXTRACTED INFORMATION |
| --- | --- |
| Profits at Canada's six big banks topped C$6 billion ($4.4 billion) in 1996, smashing last year's C$5.2 billion ($3.8 billion) record as Canadian Imperial Bank of Commerce and National Bank of Canada wrapped up the earnings season Thursday. The six big banks each reported a double-digit jump in net income for a combined profit of C$6.26 billion ($4.6 billion) in fiscal 1996, which ended on October 31. | Event: Profits topped C$6 billion Event: jump in net income Country: Canada Entity: Big banks Organization: Canadian Imperial Bank of Commerce Organization: National Bank of Canada Date: Earnings season Date: Fiscal 1996 |

With reference to Table 1, software has been used to automatically extract the various semantically significant entities and events from the document and to present them by general category using known techniques. Such techniques typically rely on syntactic analysis, and extract the definition of each constant (e.g., nouns) using dictionaries and taxonomies.

As noted, text-mining is based on multiple techniques, and generally includes shallow and deep parsing. In shallow parsing, text analysis is limited to a single document (e.g., "Mary Eats Cheese" in FIG. 2). A single sentence is analyzed, and nouns, verbs and other parts of speech are discovered along with their mutual associations. For example, in the sentence "Mary eats cheese, but Bob eats apples", Mary is associated with "cheese" and Bob is associated with "apples", and the action is "eating" for both Bob and Mary.

On the other hand, deep parsing involves textual analysis that can resolve the ambiguities which are inherent in most shallow parsing techniques. For instance, in the above example, it is not explicit what type of cheese Mary ate. Thus, deep parsing involves processing information in sentences before and after the target sentence to establish the context and help resolve ambiguities. For example, if an article is talking about cheese production in Switzerland, and Mary is described as being an American tourist in Zurich, it could be concluded that Mary ate Swiss cheese. As with most artificial intelligence techniques, deep parsing is not guaranteed to produce the correct answer, as Mary could have actually purchased and eaten American cheese in Zurich, but the first assertion is seen as more plausible.

The example cited above is based on heuristics and other associations (e.g., Zurich is in Switzerland, and Swiss implies an association with Switzerland, and thus with Zurich). A more linguistic example would be the following: "Bob and Jim were driving up north. Jim was tired, so Bob took the wheel. He was going to fast and got a speeding ticket." From the target last sentence it is unclear who got the ticket. However, "he" got the ticket is indicated in the sentence (shallow parsing), and the last reference to a male subject was to Bob, so "He" in the last sentence can be concluded yo refer to "Bob."

Linguistic Analysis

As noted above, text-mining includes a variety of techniques. In exemplary embodiments of the present invention text-mining can be implemented via a linguistic analysis using to known techniques. Linguistic analysis, as used herein, comprises two stages. Syntactic analysis and semantic analysis. Syntactic analysis, as is known in the art, involves recognizing the tokens (e.g., words and numbers) in a text through the detection and use of characters such as spaces, commas, tabs etc. For example, first, after a syntactical analysis of a document, a system according to an exemplary embodiment of the present invention would have acquired a sequential list of the tokens present in the document. Second, for example, given the tokens' constructs recognized as described above, semantic analysis rules could be applied to further analyze the document. As noted, semantic analysis rules can, for example, look for keywords as well as concepts and relationships.

Thus, in exemplary embodiments of the present invention, a dictionary as well as syntactic rules can be initially used to parse information from a document and its accompanying documentation. Subsequently, semantic rules could be applied that consider much more than simply the key words and syntax themselves by performing shallow or deep parsing of the text, and considering the relationships among the entities and events described in the text. In addition, terms appearing in the document could be looked up in a thesaurus for potential synonyms, and antonyms or other linguistic conditions can also be considered as well.

Semantic Nets and Semantic Vectors

As noted above, the output of a linguistic analysis can be, for example, a semantic net. A semantic net is a data structure which reflects the idea that the meaning of a concept comes from its relationship to other concepts. In a semantic net information is stored by interconnecting nodes with arcs or arrows, as described more fully below.

A semantic net can be mapped into a set of weighted components. In this form the mapped semantic net can be compared with similar mappings of other semantic nets to compare and contrast the information content of the documents from which the semantic nets were created.

One format for organizing a mapped semantic net is a semantic vector. A semantic vector can be constructed from a mapped semantic net, and can comprise, for example, a number of multidimensional components, each component having one or more concept values. Each concept value can also have a weighting value. In such an exemplary format a semantic vector can be conveniently processed by data processing devices such as, for example, a digital computer.

A collection of semantic vectors created as described above can be compared one with the other to identify documents with unique semantic content. This can be accomplished, for example, by defining a metric by which the semantic distance between two documents can be calculated. In an exemplary embodiment of the present invention, a semantic vector can be created to represent the claims of a given patent. A number of patents can be so represented by a corresponding number of semantic vectors for purposes of comparison. representing of various patent claims can be subtracted from the semantic vector of each of a large number of internal documents, thus identifying a handful of internal documents that present patenting potential.

Figure 4:
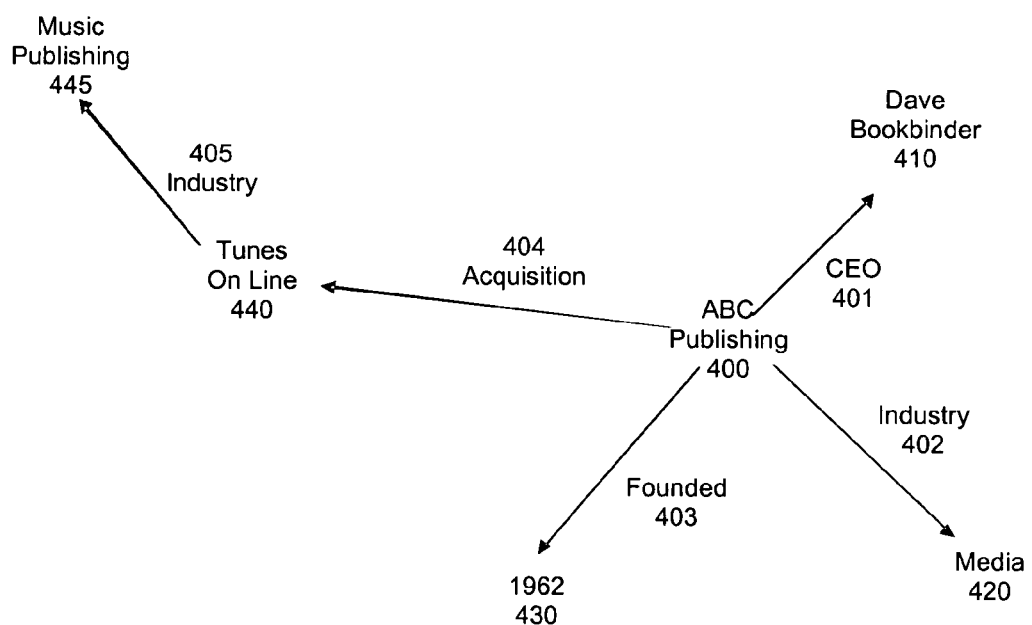
FIG. 4 illustrates an exemplary semantic net according to an exemplary embodiment of the present invention.

The concepts of semantic nets, mapped semantic nets and semantic vectors are next described with reference to FIGS. 4-6. FIG. 4 illustrates an exemplary semantic net that could be generated from a textual document. The example textual document that was used to generate the semantic net of FIG. 4 is an imaginary letter about the ABC Publishing Corporation of New York, N.Y. The semantic content of the letter includes information about the industry which the company operates in, when it was founded, who its CEO is, and a recent acquisition that it made involving a music downloading website. This information was processed into the exemplary semantic network depicted in FIG. 4, as next described.

With reference to FIG. 4, the hub or central focus of the semantic network is the company described in the letter, ABC Publishing 400. A number of semantic relationships to the company are found at spokes emanating from ABC Publishing 400 as follows. The CEO 401 of the company is Dave Bookbinder 410. The Industry 402 within which the company operates is Media 420, the company was Founded 403 in the year 1962 430, and it made a recent Acquisition 404 of a business entitled Tunes On Line 440, which is an on-line music downloading service. Tunes On Line operates within the music publishing industry and therefore there is a semantic relationship governed by the descriptor Industry 405 between Tunes On Line 440 and Music Publishing 445. As can be seen from the exemplary semantic net depicted in FIG. 4, each of the arrows represents a functionality or category at a higher level of abstraction, for each of which there is a definite or specific value to which the arrow points. For example, in general a company has a CEO 401, and the specific CEO of ABC Publishing 400 is Dave Bookbinder 410. In general a company operates within a particular industry 402 and the specific industry within which ABC Publishing 400 operates is Media 420. Every company was Founded 403 at some time and the specific year in which ABC Publishing 400 was founded is 1962 430. Companies, in the course of their business activities, often make Acquisitions 404 and the specific acquisition described in the textual document used as the source of the semantic net of FIG. 4 is Tunes On Line 440. Products or companies which are acquired can, obviously, be described by a particular Industry 405, and thus Tunes On Line 440 operates within the Music Publishing 445 industry. Thus, a semantic net can be constructed from a central term, in this case the company, and a variety of generic descriptors of relationships to that central term. Valuing these relationships are a plurality of specific values, which, as in this example, may themselves be the center of semantic subnets, as is illustrated by the value "Tunes On Line" 440 and its relational descriptor "Industry" 405, yielding the value "Music Publishing" 445.

FIG. 5 depicts how the information extracted from a document and placed in a semantic net such as illustrated in FIG. 4 can be further organized according to its relative information content within the original document. FIG. 5 is an example of a hierarchical and weighted list of the information extracted in the semantic net depicted in FIG. 4. At the top of the list, and thus seen to have most importance, is the value for the company, which is the center of the semantic net depicted in FIG. 4. This is, as above, ABC Publishing. Beneath ABC Publishing are the four generic descriptors from FIG. 4. In FIG. 5 these four generic descriptors each carry a weight, seen as a number in brackets after the generic descriptor. The weight assigned to each generic descriptor correlates to how important that descriptor or attribute is to the central concept of the semantic net, the Company. Thus, the CEO descriptor is given a weight of 100 (all weights in FIG. 5 are on a scale of 100) because the CEO of a company is often of high importance to the company.

Further, the specific person who is the CEO in the example weighting of FIG. 5 is considered of equal importance to the concept of CEO and therefore also receives a weight of 100. The information as to founding of the company is given a weight of 90, and the actual year of founding 1962 is given a lesser weight, i.e. 65, on the theory that a precise year of founding is not that important to the concept of founding of a corporation as other semantic ideas connected with the founding of a corporation may be. The industry in which the company operates is given a weight of 95 because the industry in which a company operates is often a key piece of information as regards anything relating to the company. The value for the industry in which the company operates is considered of lesser significance and therefore receives a weight of 55, the lowest weight assigned in the semantic hierarchy of FIG. 5. Finally, the fact that the company made an acquisition is given a weight of 90. The company which was the subject of the acquisition is also seen as having a rather high information content and is therefore assigned the value 88.

It is noted that weights appearing in FIG. 5 were heuristically assigned for the purposes of illustration. In exemplary embodiments of the present invention weight can be assigned using known techniques, which can vary in complexity as may be desired or appropriate.

From the hierarchical and weighted representation of the semantic information of FIG. 5, a semantic vector can be constructed. FIG. 6 depicts such an exemplary semantic vector. This particular semantic vector has five components corresponding to each of the primary relationship spokes 401 through 404 which surrounded the central concept "company" in the semantic net of FIG. 4. The first component is the central or key concept, "company", and the remaining four components corresponds to the four components 510, 520, 530 and 540 depicted in FIG. 5 in the representation. Each of the components of the semantic vector of FIG. 6 itself has a number of elements. The company component has two elements, namely the generic category "company" and the specific value "ABC Publishing." The first component in the exemplary semantic vector of FIG. 6 has no weighting, because that is the central semantic concept around which the entire semantic net was built, as depicted in FIG. 4. The remaining four components do have weights, both for the generic category in each component and the particular value within that category, such that a semantic vector can be compared with a semantic vector constructed from other documents. As can be seen in FIG. 6, the second component 610 has three elements, "ABC Publishing", "CEO (100)", and "Dave Bookbinder (100)". The third component 620 similarly has three elements: "ABC Publishing", "Founded (90)" and "1962 (65)." The fourth component 630, relating to industry, similarly has three elements: "ABC Publishing", "Industry (95)" and "Media (55)". Finally, the fifth component 640, relating to acquisitions, has three elements: "ABC Publishing", "Acquired (90)" and "Tunes On Line (88)".

As noted, the weighting assigned to elements of the semantic vector was done heuristically. In generally, weighting can be done in one of two ways (or via some combination of them). First and simplest, for example, certain key terms or concepts (e.g., CEO, Company) could be pre-weighted in a rule base, based upon the judgment of a domain expert. Second, for example, weights could be assigned (and subsequently refined) as a result of characteristics of the corpus being mined. For example, a concept such as "CEO" could be assigned an initial value of, for example, 80 and its value could be incremented for each five occurrences found in the corpus, up to a value of 100. Likewise, concepts could be assigned higher weights if they are found in conjunction with other key concepts, such as, for example, "Chairman and CEO").

The process of forming a semantic net around a key concept, transforming that to a hierarchical and weighted representation of its information, and finally processing the hierarchical and weighted representation into a semantic vector is merely exemplary. As is known in the art of text mining and semantic analysis, there are numerous ways in which to construct semantic nets and semantic vectors and, in general, the best way to implement such tools is data- and/or context-specific. Thus, the types of documents that are desired to be compared will, in many ways, determine the semantic analysis which the documents are put to and the way the information extracted by the process is organized.

Figure 7:
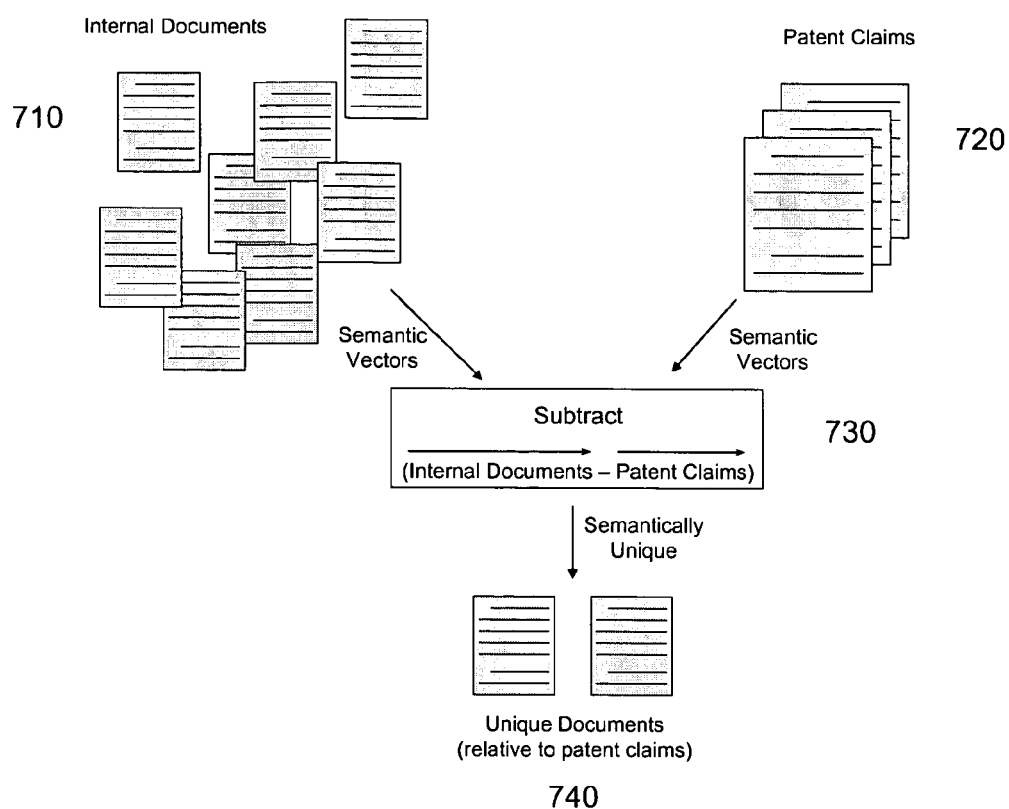
FIG. 7 illustrates an exemplary process by which documents with unique semantic content are identified according to an exemplary embodiment of the present invention.

Assuming there is an optimal application-specific format for expressing the unique semantic content of documents, analogous to the exemplary semantic vector of FIG. 6, FIG. 7 illustrates how semantic vectors can be used to automatically generate useful information for the business.

FIG. 7 illustrates an exemplary process by which documents with unique semantic content can be identified. In the example depicted in FIG. 7, Internal Documents 710 can be a number of internal documents generated from various sources within a particular company. None of the internal documents are synoptically analyzed or organized by any one department or individual within the company, and as a result there is no human intelligence which can determine which of those internal documents might contain information which is valuable intellectual property, and which at the same time has not been already patented by the company. The other set of textual documents which can be subjected to comparative analysis are patent claims 720. These can comprise, for example, the various sets of patent claims from either some or all of the then-existing patent portfolio of the company. What is desired to be accomplished in the process depicted in FIG. 7 is the comparison of the various patent claims 720 with each of the internal documents 710 to determine if there are any internal documents which are so semantically unique or distant from each of the sets of patent claims 720 that one or more internal documents may be worth further developing into a patent application. This process is depicted at 730, where the semantic vectors of each of the internal documents is subtracted from the semantic vectors of each of the patent claims one by one and, if the resulting semantic vector is of large enough magnitude, a set of semantically unique documents 740 (relative to patent claims 720) is generated. Because semantic vectors are mathematical entities, they can be easily processed by digital computers. Additionally, if they are properly defined, as known in the art, semantic vectors can be automatically generated from the sets of internal documents 710 and patent claims 720, respectively. Therefore, there is no requirement of spending the costly human resources to make the patentability analysis depicted in FIG. 7. This is precisely one of the advantages of automatic comparative analysis of textual documents using semantic vectors. The results of the process depicted in FIG. 7, as noted, is the set of unique documents 740 which can then be given to a human for analysis as to whether one or more of these semantically unique documents should be developed into a patent or other intellectual property asset.

Alternatively, another example to which the present invention could be applied is the inverse of locating documents which are patentable or novel relative to a first set. Such inverse process involves automatically locating documents with a similar semantic content to a first set. In intellectual property disputes an accused possible infringer often desires to know if the patents asserted against it are valid. If there exists prior art which teaches the invention claimed in the asserted patent or patents, this is of great defensive use to an accused infringer. Thus, in exemplary embodiments of the present invention a system could automatically search for documents whose semantic vectors are close to those of a given set of asserted patents. This example is illustrated in detail below with reference to the Appendices.

Additionally, in exemplary embodiments of the present invention the latter process could be implemented, for example, in a second stage of the first. This is because in some contexts simply searching through a corpus of documents and discarding those which have close semantic relationships to a set of patent claims does not necessarily output "patentable" material. While it can eliminate potential redundancies so that what is left are documents semantically distant from existing known patent claims, it says nothing about their potential "patent-worthiness." Thus, in exemplary embodiments of the present invention the exemplary process depicted in FIG. 7 can have a second step that takes the output from the first step and compares it to known non-patent-worthy documents; i.e., an exemplary system at this stage looks for semantic closeness to uninteresting documents. For example, a document in a corpus that is a press release announcing a new CEO is of less interest from a patenting perspective than would be a document describing a process for managing a network, and should therefore be discarded. Thus, in contexts where an exemplary process can operate upon completely arbitrary collections of documents rather than constraining the corpus to contain only a pre-qualified selection of documents, such a step could be implemented, for example, to minimize an output set fed to human analysts.

Exemplary Semantic Vector Generation

Figure 8:
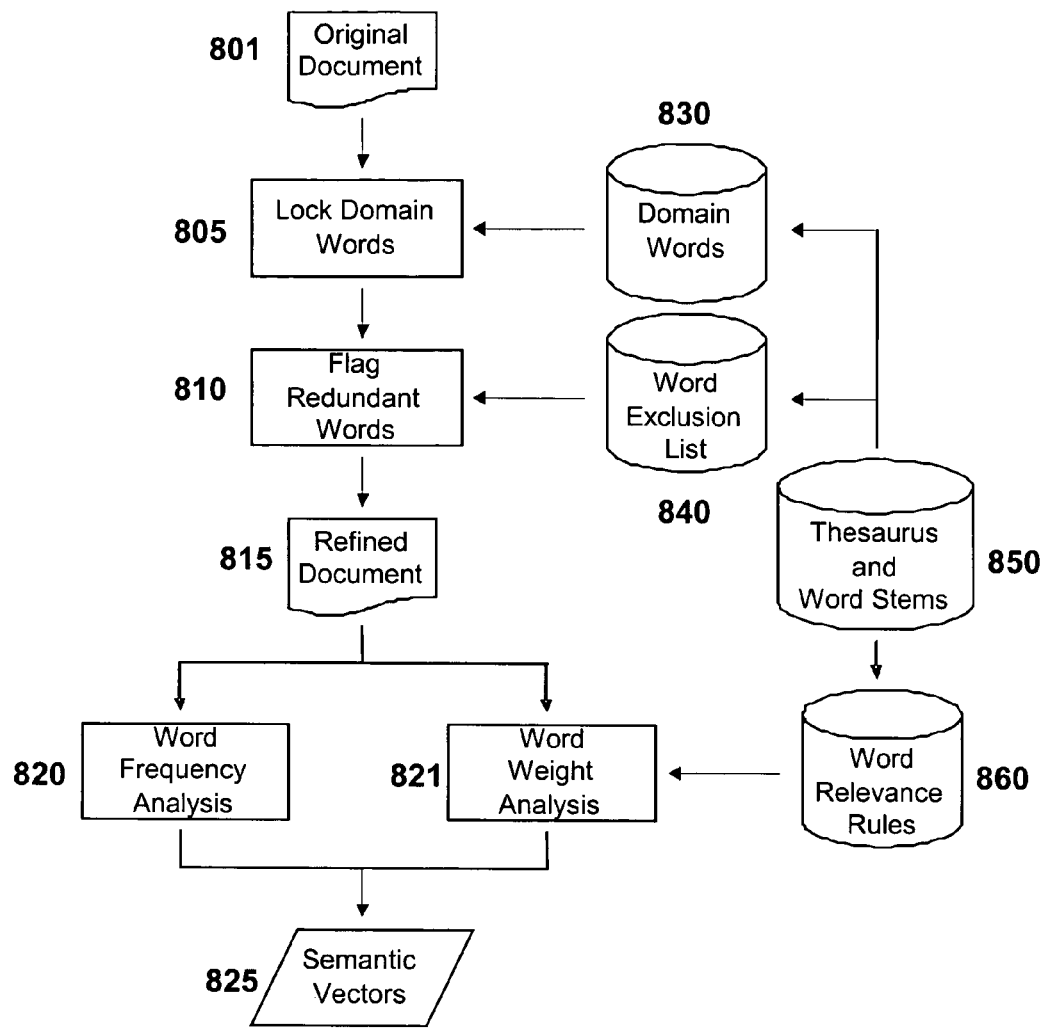
FIG. 8 is an exemplary process flow diagram for semantic vector creation according to an exemplary embodiment of the present invention.

FIG. 8 depicts an exemplary process flow for generating a semantic vector according to an exemplary embodiment of the present invention. Such process flow can be implemented, as can be any embodiment of the present invention, for example, in a software program, in a dedicated chip, chipset or other hardware configuration, or in any combination of hardware and software as may be convenient or desirable in a given context.

With reference to FIG. 8, an original document in text form 801, can be input. At 805, the relevant words in document 801 can be, for example, locked based upon a word list in database 830. This process protects domain-specific words that should be preserved for subsequent analysis. For example, in the automotive domain, such domain words can include, for example, "Steering", "Brakes", "Suspension", "Fender", and "Grill." Such domain words can, for example, be locked via insertion of hidden tags in a document, such as, for example: "<lock> Brakes </lock>." The domain words in database 830 can, for example, be further expanded with synonyms and word stems as defined, for example, in Thesaurus and Word Stems database 850. For example, in a given embodiment "Fender" and "Body Panel" may be synonymous and should be treated identically. Similarly, word stems define different ways of expressing the same word, such as, for example: "Drive", "Drove" and "Driven."

At 810 the redundant words in document 801 can be flagged, with the exception that words which were locked at 805 would not be flagged as redundant. Redundant words can, for example, be supplied by a Word Exclusion List 840. Such a list can, for example, define words that do not add semantic value to a document, such as, for example, "here", "and", "but", and "if." Redundant words can, for example, be marked individually or in groups with hidden tags, such as, for example: "<redundant> if </redundant>" or "<redundant> thus </redundant>" or "<redundant> but when the </redundant>." Redundant words in Word Exclusion List 840 can, for example, be further expanded with synonyms and word stems from Thesaurus and Word Stems database 850.

After processing at 805 and 810, refined document 815 can be generated. Refined document 815 can be identical to 801, except for the fact that domain words and redundant words (and their respective extensions) can have been marked with hidden tags, as described above.

At 820, frequency analysis can be performed on the non-redundant words in refined document 815, counting the number of occurrences of each domain word. Examples of output from frequency analysis can be, using, for example, a document 801 whose content deals with an automotive domain, "Steering 18", "Brake 9", and "Grill 7."

At 821 a weight can be assigned to each non-redundant word. Such a weight implies importance or relevance. Weights can be, for example, determined by Word Relevance Rules 860. Examples of such rules can be, for example:

If a word occurs in the first or last 15% of the document, then Weight=+5;

If a word is a domain word, then Weight=+2;

If two domain words are within 5 words of each other, then Weight=+1 for each word; and If two words are consecutive, then Weight=+1 for each word.

The weightings as assigned by the above example rules are cumulative, so an instance of a word appearing in the first 15% of a document (+5) that is also a domain word (+2), and is also within five words of another domain word (+1) would have a weight of +8. Or, for example, each key term can be given a base weight score, and the above rules or an equivalent used to cumulatively add additional score points. Numerous alternative weighting schemes are thus possible in exemplary embodiments of the present invention as may be desirable in the context, as a function of, inter alia, known semantic patterns regarding the type of document and/or the semantic domain(s) within which it falls.

As illustrated above, using a given weighting scheme, different instances of the same word can, for example, have different weights. As described more fully below, such instances can be processed separately, for example, by using the specific frequency and weight information of each instance of a word as an input to a semantic distance metric, or, for example, all instances of a given word can be combined into a composite score for that word, with an overall frequency and a composite weight. The tradeoff between such options is high resolution and detailed analysis versus available computing resources and processing time.

At 825 a tabular output can be generated, listing all of the non-redundant words, and their associated frequencies and weights as computed at 820 and 821. Output 825 may be sorted alphabetically, by frequency and/or by weight as may be appropriate in given contexts. Output 825 represents a semantic vector for document 801. Such semantic vector can be, for example, further formatted and processed prior to being input to a comparison algorithm or process, or can be processed as-is, using algorithms designed to operate on all of its components, as may be desired in given contexts.

As noted, 830 is a database of domain words, i.e., words which are known to be important in a given domain or practice. In exemplary embodiments of the present invention this database can be manually or automatically generated. Automatic generation of domain words 830 can, for example, implemented by analyzing a set of domain documents, and searching for commonly occurring words not appearing in Word Exclusion List 840.

Word Exclusion List 840 is a database of common words independent of domain. These words are those that are necessary for an original document 801 to be readable by humans, but that need not be included for semantic analysis. Database 840 may also be, for example, manually or automatically generated. Automatic generation of database 840 can involve, for example, statistical analysis of a large set of domain-independent documents, and the identification of words that occur with a high frequency.

As noted, 850 is a database of synonyms (typically domain specific) and word stems. It can, in exemplary embodiments according to the present invention, be utilized to extend databases 830 and 840 to words which are not necessarily listed in those databases.

Word Relevance Rules 860 can be, for example, a rules knowledge-base that can, for example, determine how the weights assigned to domain words should be computed. Its rules can be expressed, for example, in IF-THEN form, as illustrated above, and can be implemented via look-up tables or a commercial inference engine (i.e., an expert system). Word Relevance Rules 860 can also benefits from the information in Thesaurus and Word Stems database 850.

Automated Document Search Using Autonomous Software Module ("'Bot")

In what has been described thus far no mention has been made as to how documents which are to be semantically compared with a known set of documents are to be obtained. This can generally be done in a variety of ways, which can, in exemplary embodiments of the present invention, vary with the specific application. For example, in the exemplary embodiment of the present invention depicted in FIG. 7, where the goal is to examine a set of internal documents 710 for patentable novelty over (and thus for significant semantic distance from) a known set of patent claims 720, a central directory on a company's network can be set up, for example, where all invention descriptions, white papers, and inventor's, researcher's and/or engineer's notes are deposited. Such an exemplary system could, for example, take every document which has been stored on that directory and process it according to an exemplary embodiment of the present invention.

Alternatively, in other exemplary embodiments of the present invention, such as the search for prior art application described in the detailed example below, where a goal is to locate documents which are semantically close enough to a set of patents to potentially invalidate one or more of them, there is, in general, a much greater universe of potential documents to choose from. Simply having an exemplary system process every possible document it that can find via the Internet, available databases, or other sources would be an inefficient use of system resources.

To accomplish such a goal, human screeners could, for example, search for potentially useful documents in an initial cursory screening and deposit them in a directory. An exemplary system according to the present invention could then process those documents. Alternatively, a specialized computer program could replace the functions of human screeners and search through the Internet or other domains for documents that satisfy a number of specified conditions. Such conditions could be designed, for example, to find documents which are, for example, (i) semantically close to a given set of patents, (ii) semantically distant from a set of patent claims, (iii) semantically close to a news story of interest, (iv) semantically related to certain ideologies or activities, such as, for example, those of groups under surveillance by authorities, or (v) fitting any semantic criteria of interest in a given context. Such a program can be, for example, an autonomous software module designed to traverse a network.

Such autonomous software modules have been used in the art for a variety of purposes such as, for example, the discovery of applications resident on servers or work stations, or for the discovery of hardware devices on computer networks. Such programs are colloquially known as "robot" or "'bot" programs. Such 'bot or 'bots could be used, in exemplary embodiments of the present invention, to procure documents for semantic comparison processing according to an exemplary embodiment of the present invention. Such an exemplary process is next described.

In general, two exemplary approaches to implementing a 'bot-based traversal of a domain are possible. In one, for example, a single 'bot can be instantiated and can traverses a domain one location at a time. At each location, the 'bot's payload can be activated and run to completion, at which time the 'bot can move on to the next location in the domain. This process can continue until there are no more locations in the domain to discover, at which time the 'bot "dies." This mode of operation is simple and minimally invasive on a given domain.

In an alternate approach, where a domain is hierarchically organized, upon reaching a given level, a 'bot can spawn replicates of itself at each location on that level. Each replicate (as well as the original 'bot) then attempts to discover and spawn a replicate of itself on the next-lower level of the hierarchy (if any), where the process can repeat. This mode of operation quickly places a 'bot at every location in the domain, each having a payload ready to deploy. Improperly implemented, this mode can act in a very virus-like manner and can place a considerable strain on the domain's resources if precautions are not taken.

'Bots have two components: a mechanism for traversing the domain in which they explore, and a "payload" that performs some activity at each point in the traversal of the domain. In exemplary embodiments of the present invention a traversal mechanism can, for example, have the following characteristics. It can (a) have knowledge of its current location in the domain (e.g., an IP address on a network or a directory name in a file system); (b) have knowledge of where it has been to both aid in determining the next location to visit, and to avoid visiting already-visited locations (unless this behavior is desired), (c) know how to detect other locations in the domain (such as, for example, by pinging on an IP network); (d) have the ability to move the 'bot from location to location within a domain, retaining its heuristically acquired knowledge as it moves[1]; and (e) cause no damage to the locations it visits, respecting applicable security restrictions at each location.

[1] The ability to spawn replicates of itself is merely an instance of this capability. In a simple move operation, the original dies; in a replication mode, the original persists after spawning the replicate.

Because a 'bot can be, for example, required to discover and retain knowledge of the domain in which it operates, a traversal mechanism can, in exemplary embodiments of the present invention, be implemented as a state machine. Implicit in such a design can be, for example, the ability to discover and traverse both linearly and hierarchically organized domains in the most efficient manner possible (unless, in a given exemplary embodiment, it is desirable for a 'bot's traversal to be a random walk).

In exemplary embodiments according to the present invention a 'bot's payload can have, for example, the following characteristics. It can (a) be able to discover relevant documents at each location to which the traversal mechanism delivers it; (b) be able to open and analyze each document discovered without causing any changes to the document (including, in particular, updating of any time-and-date stamps associated with the document)[2]; (c) be capable of notifying the traversal mechanism when all relevant documents have been processed in the current location; (d) have a mechanism, described below, for identifying documents that are candidates for further semantic analysis, and for rejecting those that are not; (e) have a method for identifying to a person or to another computer program, documents that are judged to be candidates for further semantic analysis; and (f) be capable of modulating its demands for resources on the system on which it finds itself executing so as to have minimal impact on such system.

[2] In most operating systems, this could be accomplished, for example, by copying the file to a scratch location and working with the copy, then deleting it when done with the analysis.

Identifying Candidate Documents

In exemplary embodiments according to the present invention, once a traversal mechanism has delivered a 'bot to a new location, its payload can begin executing, looking for documents that are candidates for further processing. So that a 'bot may be most useful over the broadest corpus of documents, a payload's identification mechanism can have, for example, the following characteristics: (a) be implemented as a rules processing engine, with no (or very few) processing rules hard-coded into the payload; and (b) read rules stored in a central rules database which will allow centralized management of the rule base shared among all instances of the 'bot.

Figure 9:
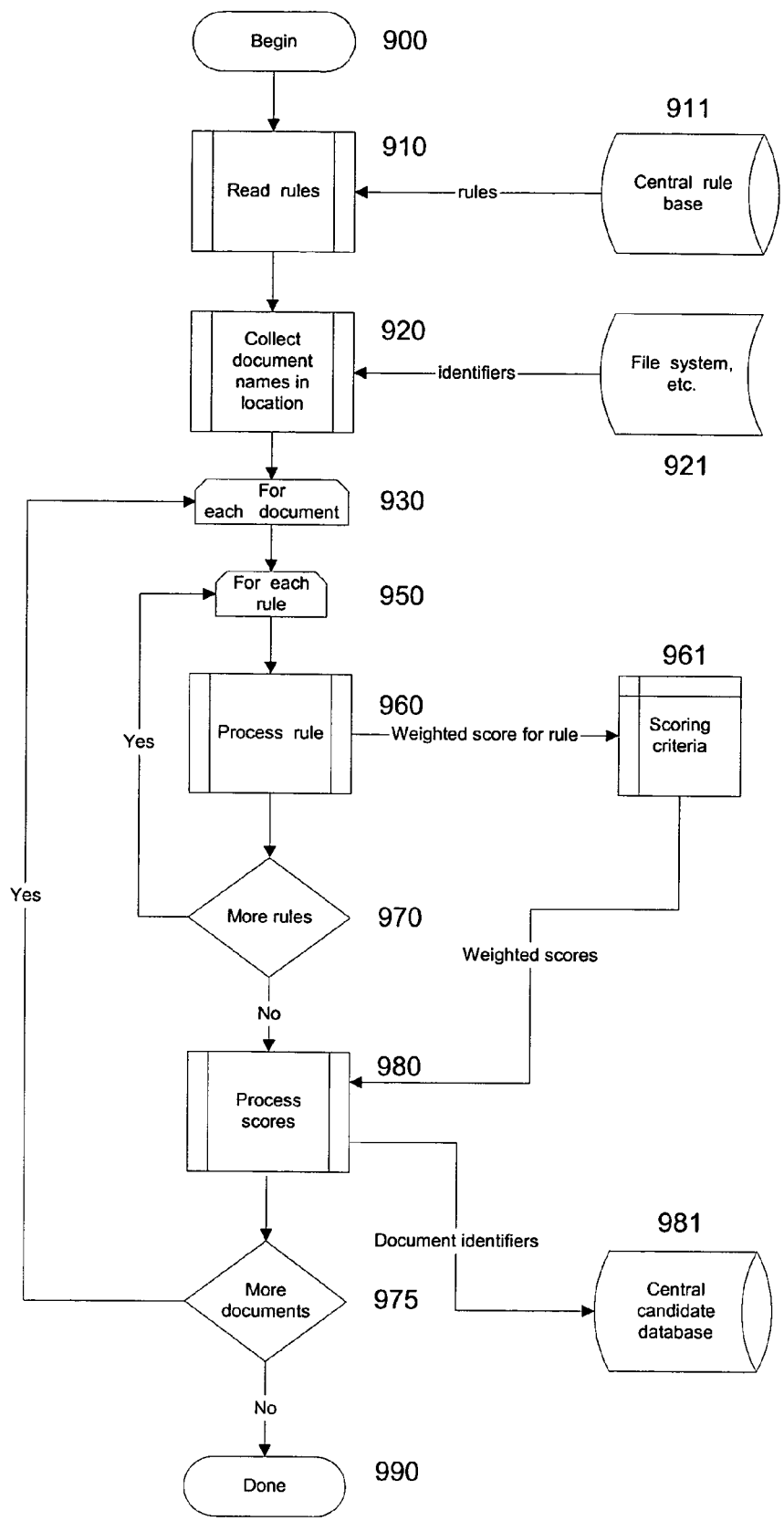
FIG. 9 is an exemplary process flow diagram for automatic document search and processing according to an exemplary embodiment of the present invention.

The operation of an exemplary payload is illustrated in FIG. 9. With reference to FIG. 9, the exemplary operation is as follows. When an exemplary 'bot arrives at a suitable location, its payload can be started at 900, for example, by the 'bot's traversal mechanism, which can then, for example, suspend execution until awoken by a signal form the payload at the end of the payload's processing (at 990 with reference to FIG. 9).

At 910 a payload can, for example, read a series of document analysis rules from a central rule base 911, storing such rules in internal storage in such a manner that they can be repeatedly cycled through for each document being processed. Then, at 920 the payload can, for example, accesses, for example, a file system 921 or other directory structure to obtain a list of the documents available at the current location. It is noted that at this point, in exemplary embodiments of the present invention, some filtering can occur so that a given 'bot can select only .doc or .txt files, for example, excluding all others. This behaviour can be controlled, for example, either by hard-coded rules, or as a result of a rules engine using a class of rules applicable to file selection.

At 930 the exemplary payload can then enter an outer processing loop, which can loop, for example, once per discovered document. If at the end of such outer loop 975 there are no more documents to be processed, i.e., there is a "No" at 975, the payload's processing is completed at 990. If there are additional documents at 975, the processing flow can, for example, re-enter the outer loop at 930. For each document found, a payload can, for example, enter an inner loop at 950, which can, for example, loop once for each rule previously read and stored (at 910). If at 970 there are no more unexecuted rules, the processing can, for example, exit the inner loop and proceed to a score processing operation 980 for that document.

A rule processing engine can, for example, apply a current rule to a given document (or, in exemplary embodiments, to a copy of the document, as described above) and can calculate a weighted score for the rule. The scores are stored in internal storage for subsequent use during the scoring process. In exemplary embodiments of the present invention, certain rules can be classified, for example, as pass/fail, implying that if the rule fails, processing of the document should immediately cease and a non-suitability flag can be asserted. Some uses of this type of rule are described below.

When there are no more rules to process (or a non-suitability flag has been asserted), a payload can exit the inner loop at 970 and enter, for example, a score processing process at 980. Here weighted scores previously calculated for the document are aggregated and/or otherwise processed in such a manner that a suitability modulus, for example, can be calculated for the document. Such a suitability modulus can be a measure of whatever semantic criteria are desired in a given application, such as, for example, semantic closeness to a given set of documents, semantic distance from a set of patent claims, semantic similarity to a certain ideology, etc. If, as described above, in exemplary embodiments of the present invention a non-suitability flag has been asserted, a zero suitability modulus can be assigned in score processing 980.

After score processing, one of two actions can take place. For example, the identifiers of all documents that have been processed, along with their suitability modula, can be written to or otherwise stored in a central candidate database 981. Alternatively, only those documents whose suitability modulus is above a certain threshold value can be stored in such central candidate database 981. Where the first exemplary option is chosen, a selection operator can be used to select documents for further analysis from central candidate database 981.

At the conclusion of all payload processing, in exemplary embodiments of the present invention, a payload can signal the traversal mechanism and then terminate.

Exemplary Rules

There are a variety of types of rules that can be applied to documents in exemplary embodiments of the present invention to assess their suitability for further semantic processing. Some rules can, for example, execute completely on their own, with no reliance upon external information. Other rules can draw upon external data sources. Both types of rules are illustrated in Table II below, which displays a number of exemplary rules that a 'bot payload can execute, as described above (corresponding to the inner loop 950, 960 and 970, with reference to FIG. 9) with explanations as to their functionalities.

TABLE II

EXEMPLARY 'BOT EXECUTABLE RULES

| # | Rule | External data required | Comments |
|---|------|-----------------------|----------|
| 1 | If filesize less than 50 KB then assert non-suitability flag | None | Assume smaller files not of interest |
| 2 | If filetype not in \|.doc .txt\| then assert non-suitability flag | None | Assume other file types not of interest |
| 3 | If count(<phrase>) > 0 then rule_score = count * rule weight | Database of phrases with weights | Phrases assumed to be one or more words long; implement as a loop, one iteration per phrase |
| 4 | If count(figures) > 0 then rule_score = count * rule weight | None | Number of figures may be significant for desired documents |
| 5 | If document is structured then score = rule weight | None | Structured documents may be of more interest than unstructured documents |

Detailed Example

Searching for Prior Art to Assert Against Issued Patents

To illustrate the methods of the present invention, an exemplary embodiment will next be described using actual textual documents. In this example the object of the documentary analysis is to find prior art to invalidate a set of existing patents. Thus there are two input document types: a set of issued patents and a variety of potentially anticipating prior art references. As is known, a patentable invention must be novel. If one can adduce prior art references that teach the claimed invention of a patent or set of patents, one can potentially invalidate the patents. Thus, in licensing contexts as well as in defending claims of patent infringement, it is often necessary to know if an asserted patent can be invalidated. This is done by locating prior art which teaches the claimed invention. The detailed example next described uses an exemplary embodiment of the present invention to automate the process of finding prior art.

In exemplary embodiments of the present invention directed to such an application, an initial screening search can be done for potentially useful prior art, and then an exemplary system can implement the comparative analysis. The initial search can be accomplished in various ways. For example, a human researcher can locate a corpus of documents that could potentially contain anticipating prior art and deposit them in electronically processable form, in a given directory or database. Alternatively, as described above, a 'bot program can be used to initially locate a corpus of documents.

Thus the appendices hereto contain two types of input documents. Two issued patents appearing in Appendix I, and five references which could potentially be prior art to these patents. The five potential references are divided into three groups. A first group consists of the Marc patent which is known to be prior art against the issued patents, as described below. The Marc patent is provided in Appendix II. The second group consists of the Maurer patent, a reference cited in each of the two issued patents, provided in Appendix III. Finally, a third group of two control patents are provided in Appendix IV. The control patents are not semantically related to the issued patents, and are used for comparison of results. Finally, Appendix V contains raw data from a semantic analysis of each of the six references used in the detailed example. The process of obtaining the raw data and its use is described below.

The detailed example was inspired by a recent opinion of the United States Court of Appeals for the Federal Circuit, *Ohio Cellular Products Corp. v. Adams U.S.A. Inc.*, decided on Dec. 23, 1996, available at 41 U.S.P.Q.2d 1538 (1996). The subject of the opinion were two related U.S. patents, U.S. Pat. Nos. 4,980,110 and 5,273,702 (the "Issued Patents"), which are directed to methods of forming cross-linked foamed polyolefin articles. In *Ohio Cellular* the court held that the two issued patents were invalid, having been anticipated by U.S. Pat. No. 4,524,037 to Marc ("Marc") directed to a method of forming a flexible thermoplastic resin foam article. Additionally, each of the Issued Patents cites as a reference U.S. Pat. No. 4,595,551 to Maurer ("Maurer") which deals with the formation of styrenic foam laminates. Assumably there is a close semantic relationship between the Issued Patents and Maurer. As an illustration of an exemplary embodiment of the present invention, the semantic distance between the anticipating Marc reference and each of the Issued Patents and the Maurer patent was measured. As a control, two patents completely unrelated to the rest, U.S. Pat. Nos. 4,627,177 and 4,364,189 (the "Control Patents"), directed to an insole structure and a running shoe, were also analyzed and the semantic distance between them and Marc measured as well. Each of the patents used in the example, as well as the raw data generated by an exemplary semantic analysis thereof, is presented in the appendices which follow. What is next described are the details of how semantic vectors were formed and compared in this detailed example, culminating in the results displayed in Table III.

Raw Data

As indicated above, Appendix V contains raw data from the analysis of the patents used in this example. The data in Appendix V were generated using an exemplary computer program designed to (i) identify key terms which indicate a semantic content, and (ii) calculate the frequency and assign a weight to each such term, as described above in connection with semantic vector creation. Instead of terms in isolation, the program looks at main concepts and subordinate concepts appearing in proximity, calculates the frequency of and assigns a weight to each main concept-subordinate concept combination. The program also provides an overall or composite weight for each main term. For purposes of the detailed example, a weight based metric was used, so frequency data was not needed. However, the exemplary metric made use of synonyms to the concepts. Thus, for example, with reference to Appendix V(A)(1), if one document contained the concept "plastic" and another did not, but did contain the synonymous words "polyolefin", "styrenic" or "resilient material", a semantic comparison could be made by treating these synonymous terms as semantically equivalent.

frequency-weight} data presents a composite frequency[3] and weight score for each key term derived from the more detailed {concept-frequency-weight-subordinate concept} data appearing immediately after it in Section 2 of each part of Appendix V. Although only the data listed in Section 1 of each part of Appendix V was used in the exemplary semantic distance calculations summarized in Tables III and V, the remaining data is provided for completeness, to illustrate various possibilities in generating semantic vectors.

[3] It is noted that because the frequency values in the {concept-frequency-weight} listings appearing at the beginning of each Section 2 in Appendix V are composite values, they are not necessarily the simple sum of all of the instances of a given concept listed in the detailed {concept-frequency-weight-subordinate concept} data listings. The composite frequency values used in this example data adjust for overlap.

Table III presents a comparison of the semantic distances between the Marc patent and each of the other patents included in the example using the {concept-weight-synonyms} data provided in Section 1 of each part of Appendix V. Table IV provides the legend for interpreting Table III.

TABLE III

SEMANTIC DISTANCES FROM MARC
Prior Art - U.S. Pat. No. 4,524,037 (Marc)

| Type | Patent # | Concept | w-Delta | n | w_Avg | w (prior art) | w (document) |
|---|---|---|---|---|---|---|---|
| Issued 1 | 4,980,110 | Cavity | 52 | | 68 | 42 | 94 |
| | | Heating | 26 | | 82 | 95 | 69 |
| | | Means | 65 | | 38 | 70 | 5 |
| | | Plastic (S) | 65 | | 48 | 15 | 80 |
| | | Temperature | 0 | | 77 | 77 | 77 |
| | | Forming (S) | 68 | | 48 | 14 | 82 |
| | | | | 6 | | | |
| | | Distance | 1.92 | | | | |
| Issued 2 | 5,273,702 | Cavity | 52 | | 68 | 42 | 94 |
| | | Forming (S) | 75 | | 52 | 14 | 89 |
| | | Heating | 35 | | 78 | 95 | 60 |
| | | Means (S) | 25 | | 83 | 70 | 95 |
| | | Plastic (S) | 63 | | 47 | 15 | 78 |
| | | Temperature | 5 | | 75 | 77 | 72 |
| | | | | 6 | | | |
| | | Distance | 1.91 | | | | |
| Reference | 4,595,551 | Means (S) | 20 | | 80 | 70 | 90 |
| | | Plastic (S) | 71 | | 51 | 15 | 86 |
| | | Temperature | 8 | | 73 | 77 | 69 |
| | | | | 3 | | | |
| | | Distance | 4.97 | | | | |
| Control 1 | 4,627,177 | Material | 11 | | 93 | 87 | 98 |
| | | | | 1 | | | |
| | | Distance | 1491.74 | | | | |
| Control 2 | 4,364,189 | Means | 21 | | 60 | 70 | 49 |
| | | Plastic (S) | 71 | | 51 | 15 | 86 |
| | | | | 2 | | | |
| | | Distance | 19.43 | | | | |

Thus, with reference to Appendix V, for each analyzed document, there are two alternate listings of the linguistic data presented, appearing in Sections 1 and 2, respectively. The first listing represents the data used in the exemplary semantic analysis summarized in Tables III, IV and V below. This data is in the format {concept-weight-synonyms}. The second is in the format {concept-frequency-weight} and {concept-frequency-weight-subordinate concept}. All three formats are examples of semantic vectors that could be generated from the documents in exemplary embodiments of the present invention.

The {concept-weight-synonyms} data is derived from the {concept-frequency-weight} data by deleting the frequency information and expansion using a synonyms table, as described above with reference to FIG. 8. The {concept-

TABLE IV

LEGEND FOR TABLE III

| | |
|---|---|
| Concept | A linguistic term that defines a semantic content. |
| w-Delta | Difference in Weights. |
| w-Avg | Average of Weights. |
| w(prior art) | Weight of the concept in the prior art document |
| w(document) | Weight of the concept in the current document |
| n | Number of matching concepts. |
| Distance | Semantic distance between two documents given by: Sqrt(sum((w-Delta)^2 * w-Avg)/(Log(n)^3 * 1000). |
| (S) | Indicates expansion of concept to include its synonyms. |

Note:
An epsilon value of e = 0.1 was used to prevent division by zero in Control 1.

As can be seen with reference to Tables III and IV, the exemplary semantic distance metric takes as inputs the number of matching concepts, n, the difference in the weights for each such concept between the two documents being compared, w–Delta, and the average of the weights of each such concept over the two documents being compared, w–Avg. The quantities w–Delta and w–Avg are functions of the weight of each common concept in the Marc patent (labelled as "w (prior art)" in Table III) and in the document being compared with Marc (labelled as "w (document)" in Table III).

analyze the short list of semantically close references to determine which are arguably anticipating and which are simply semantically close to a given patent. Semantic closeness of a reference is a necessary, but not always sufficient, condition for anticipation of a patent, inasmuch as patents tend to describe aspects of a given invention that are both old and new in the same document. Additionally, in exemplary embodiments of the present invention directed to finding prior art to invalidate patents, a more complex metric such as a "anticipation modulus" could be articulated, which could take into account factors besides semantic distance alone, to better model patent anticipation.

TABLE V

SEMANTIC DISTANCES FROM MAURER
Cited Reference - U.S. Pat. No. 4,595,551 (Maurer)

|  |  | Concept | w-Delta | n | w_Avg | w (reference] | w (document) |
|---|---|---|---|---|---|---|---|
| Issued 1 | 4,980,110 | Outer | 27 |  | 80 | 66 | 93 |
|  |  | Heating | 63 |  | 38 | 6 | 69 |
|  |  | Method | 10 |  | 85 | 90 | 80 |
|  |  | Styrenic (S) | 6 |  | 83 | 86 | 80 |
|  |  | Temperature | 8 |  | 73 | 69 | 77 |
|  |  | Thermoforming (S) | 75 |  | 45 | 7 | 82 |
|  |  |  |  | 6 |  |  |  |
|  |  | Distance | 1.46 |  |  |  |  |
| Issued 2 | 5,273,702 | Outer | 28 |  | 80 | 66 | 94 |
|  |  | Thermoforming (S) | 82 |  | 48 | 7 | 89 |
|  |  | Heating | 54 |  | 33 | 6 | 60 |
|  |  | Method | 9 |  | 86 | 90 | 81 |
|  |  | Styrenic (S) | 8 |  | 82 | 86 | 78 |
|  |  | Temperature | 65 |  | 40 | 7 | 72 |
|  |  |  |  | 6 |  |  |  |
|  |  | Distance | 1.73 |  |  |  |  |

Table III thus corroborates the findings of the Ohio Cellular court, inasmuch as the Marc reference is seen to be of approximately equal semantic distance to each of the Issued Patents, and that semantic distance is significantly closer than is the semantic distance between Marc and Maurer, or Marc and either of the control patents. These results indicate that using an exemplary embodiment of the present invention one can quantify the semantic content of each of a number of documents and can use a quantification of such semantic content, i.e., a semantic vector, to compare the semantic content between any two documents using a semantic distance metric.

As can be seen in Table IV, semantic distances in the depicted exemplary embodiment were calculated using the metric:

$$\text{Semantic distance} = \text{Sqrt}(\text{sum}((w-\text{Delta})\wedge 2 * w-\text{Avg}))/(\text{Log}(n)\wedge 3 * 1000) \quad \text{(Eq. 1)}$$

For purposes of comparison, Table V below depicts the results of performing the same analysis as is illustrated in Table III to the semantic distance between the cited Maurer reference and the two Issued Patents. As can be seen with reference to Table V, using the exemplary analysis and metric described above, the semantic distance between each of the Issued Patents and Maurer is 1.46 and 1.73, respectively. This is on the same order of magnitude as the semantic distance between the two issued patents and Marc. It is noted that while Maurer is slightly semantically closer to the Issued Patents than is Marc, from the point of view of patent jurisprudence Marc was an invalidating reference whereas Maurer was not. Thus a human reviewer would generally be needed to Other Metrics A variety of alternate exemplary semantic comparison metrics could be used in given exemplary embodiments, ranging from the simple to the highly complex, as may be desirable. For example, a given metric could operate on {main term-weight-subordinate term} data such as is provided in Appendix V, or on various other possible data formats. Alternatively, a semantic comparison or distance metric could include inputs for both weight and frequency values for each common main term between two documents being compared. With an increase in the complexity of a semantic distance algorithm there is generally an increase in accuracy or resolution at the cost of increased computing overhead and processing operations.

For example, using frequency information instead of weight information an exemplary formula for calculating a semantic distance can be, for example, a Euclidean distance obtained by taking the square root of the sum of each of a number of f-Delta's squared and dividing that number by the square of the number n of key terms involved, and then multiplying such a ratio by 100, as expressed in Equation 2 below. In analogous fashion to the w–Delta values of the example of Table III, an f-Delta can be, for example, the difference in frequency between two common concepts. In general terms, such an exemplary formula can be:

$$\frac{\text{Sqrt}(f1^2 + f2^2 + f3^2 + f4^2 + \ldots + f(N-1)^2 fN^2)}{n^2} * 100 \quad \text{(Eq. 2)}$$

where n=the number of common concept terms between the two documents being compared, and fN=the f-Delta between two common concept terms.

As can be seen from Equation 2, in this exemplary metric the semantic distance can take as inputs, for example, only the composite frequency values of main terms (in more complex embodiments it may be desirable to use f-Deltas based on the detailed {main term-subordinate term} pairs found in Section 2 of each part of Appendix V, and n would then be the number of such common pairs). Thus, referring to Table III, for each common concept between the Marc reference and each of the other patents, the overall frequency values of common concepts (as expanded by synonyms) could be compared. For example, taking the Marc reference versus Issued 1, the term "cavity" appears in each of these documents, with frequencies 10 and 13 respectively, as can be seen from Appendix V(A)(2), row 2, and Appendix V(B)(2), row 2. Such an (f-Delta)$^2$ can, for example, be computed as follows: (f-Delta)$^2$=(10−13)$^2$=(−3)$^2$=9.

Obviously, if there are no terms in common between two documents under analysis, there would be no possible calculation of a semantic distance. Accordingly, Equation 2 reduces to infinity where n=0, denoting infinite semantic distance. Additionally, if a common concept term has an identical frequency in each document, the f-Delta for that concept is zero, and there is no contribution to the semantic distance from that common concept, as expected. If all common terms have the same frequency then the numerator in Equation 2 reduces to zero, denoting no semantic distance at all.

Various other metrics can be articulated as may be appropriate as a function of the domain or subject matter to which documents under comparison relate, or as may define a certain quality, such as, for example, a "modulus of anticipation" in the patent domain, as noted above. Such metrics can vary significantly, being functions of the near infinite variety of documents that can be compared in exemplary embodiments of the present invention.

What is claimed:

1. A computer-implemented method of comparing the semantic content of two or more documents, comprising:
    accessing a plurality of documents;
    performing a linguistic analysis on each document;
    defining a semantic vector for each document based on the linguistic analysis, said semantic vector having multiple components, wherein each component of said semantic vector has at least:
        a weighting factor relating to an importance, based on characteristics of the document, of said term; and
        a frequency value relating to a number of occurrences of said term;
    processing the semantic vector by a digital computer; and
    comparing a semantic vector of an identified document to the semantic vector for each document in the plurality of documents to determine at least one document semantically similar to the identified document, and wherein the comparing of the semantic vectors includes using a defined metric, wherein said defined metric is related to:
        $Sqrt(f1^2+f2^2+f3^2+f4^2+ +f(N-1)^2 fN^2)*100n^2$, wherein f is a difference in frequency of a common term between documents and n is the number of terms those documents have in common if the component has a weighting factor; or
        $Sqrt(sum((w-Delta)^2 * w-Avg))/(Log(n)^3 * 1000)$,
        wherein w−Delta is the difference in weight between two common terms, w−Avg is the average weight between two common terms, and n is the number of common terms if the component has a frequency value.

2. The method of claim 1, wherein the linguistic analysis comprises sentence analysis.

3. The method of claim 2, wherein the sentence analysis comprises a syntactic analysis and a semantic analysis.

4. The method of claim 1, wherein each component of the semantic vector for at least one of the documents comprises multiple dimensions.

5. The method of claim 1, wherein each component of the semantic vector for at least one of the documents further comprises a subordinate concept value.

6. The method of claim 1, wherein some of the components of the semantic vector for at least one of the documents have main term-subordinate term pairs as their first value.

7. The method of claim 1, wherein the semantic vector comprises a multi-dimensional vector defined by the content of a semantic net.

8. The method of claim 7, wherein the content of the semantic net is augmented by relative weights, strengths, or frequencies of occurrence of the features within the semantic net.

9. The method of claim 1, wherein said term comprises at least one of a word or a phrase.

10. The method of claim 1, further comprising comparing the semantic vectors based on a defined algorithm.

11. The method of claim 10, wherein an output of said defined algorithm is a measure of at least one of semantic distance, semantic similarity, semantic dissimilarity, degree of patentable novelty and degree of anticipation.

12. A computer-implemented method of comparing two or more documents, comprising:
    linguistically analyzing a plurality of documents to identify at least one term group in each document, each term group comprising a main term and at least one subordinate term semantically related to the main term;
    generating a semantic vector associated with each document, the semantic vector comprising a plurality of components, each component including:
        a term group as a scalar in the document;
        a frequency value relating to a number of occurrences of the term group; and
        processing the semantic vector by a digital computer; and
    comparing a semantic vector of an identified document to the semantic vector for each document in the plurality of documents to determine at least one document semantically similar to the identified document using a defined metric, wherein said metric measures the semantic distance between documents as a function of at least the frequency values included in the semantic vectors for the documents, and wherein said metric is related to:
        $Sqrt(f1^2+f2^2+f3^2+f4^2+ +f(N-1)^2 fN^2)*100n^2$ wherein f is a difference in frequency of a common term between the plurality of documents and n is the number of terms those documents have in common.

13. The method of claim 12, wherein the main term includes synonyms of the main term.

14. The method of claim 12, wherein one or more of said two or more documents are located using an autonomous software or 'bot program.

15. The method of claim 14, wherein the 'bot program automatically analyzes each document in a defined domain or network by executing a series of rules and assigning an overall score to the document.

16. The method of claim 15, wherein all documents with a score above a defined threshold are linguistically analyzed.

17. The method of claim 12, wherein the semantic vector is a quantification of the semantic content of each document.

18. The method of claim 12, wherein each component has multiple dimensions.

19. The method of claim 12, wherein the at least one subordinate term includes synonyms of one of the subordinate terms.

20. The method of claim 12, wherein one or more of the at least one subordinate term or the main term comprises a phrase.

21. The method of claim 12, wherein the weighting factor comprises a plurality of different weighting factors and each of the different weighting factors relates to the importance of the main term or a subordinate term in the term group.

22. A system for comparing two or more documents, comprising:
   a document inputter, arranged to access a plurality of documents;
   a semantic analyzer, arranged to perform a linguistic analysis on each document to identify at least one term group in the document, each term group comprising a main term and at least one subordinate term semantically related to the main term;
   a semantic quantifier, arranged to output a quantified representation of a semantic content of each document, the quantified representation based at least in part on:
      a term group as a scalar in the document; and
      a weighting factor relating to an importance, based on characteristics of the document, of at least part of the term group; and
   a comparator, arranged to compare the quantified representations using a defined metric, wherein said defined metric measures the semantic distance between documents as a function of at least the weighting factors associated with the quantified representations for the documents to determine at least one document in the plurality of documents semantically similar to an identified document, and wherein said defined metric is related to:
   $Sqrt(sum((w-Delta)^2 * w-Avg)/Log(n)^3 * 1000)$,
      wherein w−Delta is the difference in weight between two common terms, w−Avg is the average weight between two common terms, and n is the number of common terms, between two documents.

23. A system for comparing two or more documents, comprising:
   a document inputter, arranged to access a plurality of documents;
   a semantic analyzer, arranged to perform a linguistic analysis on each document to identify at least one term group in the document, each term group comprising a main term and at least one subordinate term semantically related to the main term;
   a semantic vector generator, arranged to output a semantic vector associated with each document, each semantic vector comprising a plurality of components, each component including:
      a term group as a scalar in the document;
      a frequency value relating to a number of occurrences of the term group; and
   a comparator, arranged to compare the semantic vectors using a defined metric, wherein said metric measures the semantic distance between documents as a function of at least the frequency values included in the semantic vectors for the documents to determine at least one document in the plurality of documents semantically similar to an identified document, and wherein said metric is related to:
   $Sqrt(f1^2 + f2^2 + f3^2 + f4^2 + + f(N-1)^2 fN^2) * 100n^2$ wherein f is a difference in frequency of a common term between the plurality of documents and n is the number of terms those documents have in common.

24. A computer program product comprising a computer usable medium device having computer readable program code means embodied therein, the computer readable program code means in said computer program product comprising means for causing a computer to:
   access a plurality of documents;
   perform a linguistic analysis on each document to identify at least one term group in the document, each term group comprising a main term and at least one subordinate term semantically related to the main term;
   output a quantified representation of a semantic content of each document, the quantified representation based at least in part on:
      a term group as a scalar in the document;
      a frequency value relating to a number of occurrences of the term group; and
   compare the quantified representations using a defined algorithm, wherein said defined metric measures the semantic distance between documents as a function of at least the frequency values associated with the quantified representations for the documents to determine at least one document in the plurality of documents semantically similar to an identified document, and wherein said metric is related to:
   $Sqrt(f1^2 + f2^2 + f3^2 + f4^2 + + f(N-1)^2 fN^2) * 100n^2$ wherein f is a difference in frequency of a common term between the plurality of documents and n is the number of terms those documents have in common.

25. A computer program product comprising a computer usable medium device having computer readable program code means embodied therein, the computer readable program code means in said computer program product comprising means for causing a computer to:
   linguistically analyze a plurality of documents to identify at least one term group in the document, each term group comprising a main term and at least one subordinate term semantically related to the main term;
   generate a semantic vector associated with each document, each semantic vector comprising a plurality of components, each component including:
      a term group as a scalar in the document; and
      a weighting factor relating to an importance, based on characteristics of the document, of at least part of the term group; and
   compare the semantic vectors using a defined metric, wherein said metric measures the semantic distance between semantic vectors as a function of at least the weighting factors included in the semantic vectors to determine at least one document in the plurality of documents semantically similar to an identified document, and wherein said defined metric is related to:
   $Sqrt(sum((w-Delta)^2 * w-Avg))/(Log(n)^3 * 1000)$,
      wherein w−Delta is the difference in weight between two common terms, w−Avg is the average weight between two common terms, and n is the number of common terms, between two documents.

26. The computer program product of claim 25, wherein the computer readable program code means in said computer program product further comprises means for causing a computer to:
   identify one or more of said two or more documents using an autonomous software or 'bot program.

27. The computer program product of claim 26, wherein said 'bot program automatically analyzes each document in a defined domain or network by executing a series of rules and assigning an overall score to the document.

28. The computer program product of claim 25, wherein the semantic vector is a quantification of the semantic content of each document.

29. The computer program product of claim 25, wherein an output of said defined metric is a measure of at least one of semantic distance, semantic similarity, semantic dissimilarity, degree of patentable novelty and degree of anticipation.

30. A system for comparing two or more documents, comprising:
   a document inputter, arranged to access two or more documents;
   a semantic analyzer, arranged to perform a linguistic analysis on each document;
   a semantic vector generator, arranged to output a semantic vector associated with each document; and
   a comparator, arranged to compare the semantic vectors using a defined metric, wherein said defined metric is one of:
   $[Sqrt(f1^2+f2^2+f3^2+f4^2+ +f(N-1)^2fN^2/n]*100$, wherein f is a difference in frequency of a common term between two documents and n is the number of terms those documents have in common; or
   $Sqrt(sum((w-Delta)^2*w-Avg))/(Log(n)^3*1000)$, wherein w-Delta is the difference in weight between two common terms, w-Avg is the average weight between two common terms, and n is the number of common terms, between two documents.

31. A computer-implemented method of comparing two or more documents, comprising:
   linguistically analyzing a plurality of documents;
   generating a semantic vector associated with each document;
   processing the semantic vector by a digital computer; and
   comparing the semantic vectors using a defined metric, wherein said defined metric is one of:
   $[Sqrt(f1^2+f2^2+f3^2+f4^2+ +f(N-1)^2fN^2/n]*100$, wherein f is a difference in frequency of a common term between documents and n is the number of terms those documents have in common; or
   $Sqrt(sum((w-Delta)^2*w-Avg))/(Log(n)^3*1000)$, wherein W-Delta is the difference in weight between two common terms, w-Avg is the average weight between two common terms, and n is the number of common terms, between documents to determine at least one document in the plurality of documents semantically similar to an identified document.

32. A computer program product comprising a computer usable medium device having computer readable program code means embodied therein, the computer readable program code means in said computer program product comprising means for causing a computer to access two or more documents;
   perform a linguistic analysis on each document;
   output a quantified representation of a semantic content of each document; and
   compare the quantified representations using a defined algorithm, wherein said defined algorithm is one of:
   $[Sqrt(f1^2+f2^2+f3^2+f4^2+ +f(N-1)^2fN^2/n]*100$, wherein f is a difference in frequency of a common term between two documents and n is the number of terms those documents have in common; or
   $Sqrt(sum((w-Delta)^2*w-Avg))/(Log(n)^3*1000)$, wherein w-Delta is the difference in weight between two common terms, w-Avg is the average weight between two common terms, and n is the number of common terms, between two documents.

* * * * *

UNITED STATES PATENT AND TRADEMARK OFFICE
CERTIFICATE OF CORRECTION

PATENT NO. : 8,868,405 B2  
APPLICATION NO. : 10/766308  
DATED : October 21, 2014  
INVENTOR(S) : Kas Kasravi et al.

It is certified that error appears in the above-identified patent and that said Letters Patent is hereby corrected as shown below:

In the Claims

In column 23, line 15, in Claim 22, after "inputter," insert -- of a hardware device, --.

In column 23, line 37, in Claim 22, delete "Avg)/Log" and insert -- Avg))/(Log --, therefor.

In column 23, line 44, in Claim 23, after "inputter," insert -- of a hardware device, --.

In column 25, line 12, in Claim 30, after "inputter," insert -- of a hardware device, --.

In column 25, line 21, in Claim 30, delete "$fN^2/n]$" and insert -- $fN^2)/n]$ --, therefor.

In column 26, line 3, in Claim 31, delete "$fN^2/n]$" and insert -- $fN^2)/n]$ --, therefor.

In column 26, line 8, in Claim 31, delete "W-Delta" and insert -- w-Delta --, therefor.

In column 26, line 19, in Claim 32, delete "to" and insert -- to: --, therefor.

In column 26, line 26, in Claim 32, delete "$fN^2/n]$" and insert -- $fN^2)/n]$ --, therefor.

Signed and Sealed this  
Twenty-fifth Day of August, 2015

Michelle K. Lee  
*Director of the United States Patent and Trademark Office*